(No Model.)
W. F. GLENN.
OVERHEAD TROLLEY CARRIER.
No. 472,756. Patented Apr. 12, 1892.
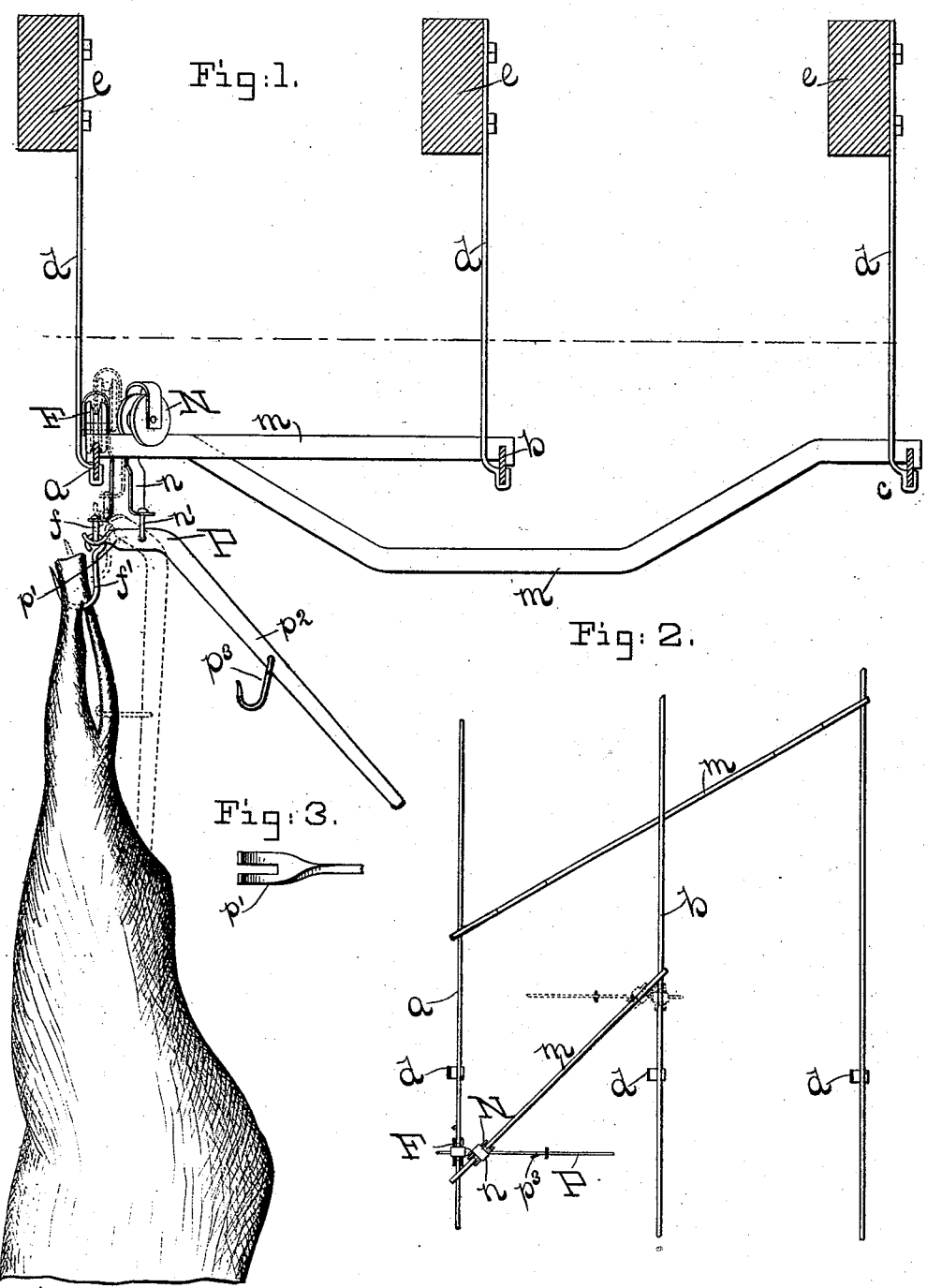
Witnesses:
Fred S. Greenleaf
Edward F. Allen
Inventor.
William F. Glenn.
By Lemby & Gregory
Attys

UNITED STATES PATENT OFFICE.

WILLIAM FISH GLENN, OF LEXINGTON, ASSIGNOR OF ONE-HALF TO HARRY A. VOSE, OF NATICK, MASSACHUSETTS.

OVERHEAD-TROLLEY CARRIER.

SPECIFICATION forming part of Letters Patent No. 472,756, dated April 12, 1892.

Application filed May 26, 1891. Serial No. 394,223. (No model.)

*To all whom it may concern:*

Be it known that I, WILLIAM FISH GLENN, of Lexington, county of Middlesex, State of Massachusetts, have invented an Improvement in Overhead-Trolley Carriers, of which the following description, in connection with the accompanying drawings, is a specification, like letters on the drawings representing like parts.

It is customary at the present time in slaughter-houses, store-houses, and the like to employ overhead tracks or rails, on which run trolleys carrying hooks, from which may be suspended quarters of beef, &c. In large warehouses there are frequently two or more lines of track, which may or may not be parallel and on which the beef may be rolled from one end of a track to the other end thereof; but it has hitherto been impossible to transfer a trolley carrying a quarter of beef from one track to another parallel track without lifting the same bodily from one track to the other.

This invention has for its object the production of a device whereby any particular quarter of beef may be selected from a large number upon one track and quickly and easily transferred to another parallel track.

In accordance with this invention I provide an intermediate or cross-over piece adapted to rest upon and extend between two tracks to be employed in making the change. A movable carrier or trolley mounted on this intermediate cross-over carries a transferring device, preferably in the form of a movable handle or lever, adapted to hook under and lift a trolley carrying a quarter of beef, and while so lifted the carrier or trolley on the cross-over may be run to the opposite or desired track and the trolley carrying the beef deposited thereon.

One part of this invention in transferring device for overhead-trolley carriers therefore consists in a cross-over to connect two rails, a movable carrier thereon, and a transferring device carried by said carrier.

Other features of this invention will be hereinafter pointed out, and set forth in the claims.

Figure 1 represents in section three parallel tracks, the same connected by cross-over pieces to illustrate my invention. Fig. 2 shows a plan view thereof on a reduced scale; Fig. 3, a detail of the hook end of the lifting-lever.

Referring to the drawings, the rails or tracks $a\ b\ c$ are and may be sustained in any suitable manner from an overhead support—as, for instance, by means of suitable brackets $d$, bolted or otherwise secured to the overhead beams $e$. In accordance with the prevailing custom trolleys F run upon the said rails, only one trolley being shown upon the rail $a$ in the drawings, said trolley carrying in usual manner the swivel-eye $f$, carrying a hook $f'$, to which may be suspended an article—such, for instance, as a quarter of beef—represented in the drawings.

In accordance with this invention, a cross-over piece or track $m$ is placed, preferably, diagonally between and rests upon the rails $a\ b$, the said cross-over being slotted at its ends to fit over the rails $a\ b$, said slots serving to hold the cross-over in proper vertical position.

A trolley N, mounted to run on the cross-over $m$, is journaled in a suitable carrier or supporting-piece $n$, carrying the transferring device, herein represented as a swivel-eye $n'$, in which is pivoted the lifting arm or lever P. The lever P, as herein represented, has a short arm $p'$ at one side of its fulcrum and a long arm $p^2$ at the other side of its fulcrum, the short arm $p'$ being formed, as shown in Fig. 3, to serve as a forked lifting-hook.

The operation of my improved device is as follows: Assuming the rail $a$ to have a number of quarters of beef or other articles upon trolleys F, one of which it is desired to transfer to the rail $b$, the cross-over $m$ will be placed upon the rails $a\ b$, as indicated in Fig. 2, the cross-over being so placed that its end which rests upon the rail $a$ will be adjacent to or alongside of the trolley F on which the beef to be transferred hangs. When the cross-over is placed in such position, as shown in Fig. 2, the trolley on the cross-over is run up to the rail $a$ and the long arm $p^2$ of the lever P is raised and turned so that the short arm or forked hook $p'$ may be placed under the swivel-eye $f$ of the trolley F. When the long arm $p^2$ of the lever P is depressed to its dotted-line position, Fig. 1, it acts by such movement to lift the trolley F and the beef or other article suspended therefrom into the dotted-line position, Fig. 1, removing the trolley from the rail $a$. The long arm $p^2$ of the lever P may be provided with a hook $p^3$, which may be passed behind the gambrel of the beef, as indicated in dotted lines, to thus hold the lever in its dotted-line position, with the trolley F lifted from its rail $a$. The trolley F and the article suspended from it are now supported entirely on the short arm or hook $p'$ of the lever P, and in such position the trolley N may be run upon the cross-over to the rail $b$, when the lever P may be rotated into its dotted-line position, Fig. 2, the hook $p^3$ disengaged, and the trolley dropped upon the rail $b$ and thereafter carried to any desired point upon said rail.

It will be evident that any number of articles may be transferred from one rail to the other, for as fast as one is transferred another upon the same rail may be run up to the crossover and transferred in like manner.

In large warehouses, where several parallel rails or tracks may be employed, several crossovers may be provided for any two of the rails—as, for instance, referring to Fig. 1, a cross-over may be provided to transfer articles from the rail $a$ to the rail $c$, said crossover being dropped sufficiently to clear the intermediate rail or rails, so that any article taken from the rail $a$ may be run upon the cross-over $m$ beneath any intervening rails, as $b$, and up again to the desired rail $c$.

It will be evident that this invention may be readily adapted with slight modifications to any variety or character of service. Therefore I do not limit the invention to the particular device and construction shown, as the same may be varied and still come within the scope of this invention.

The relation between the long arm $p^2$ of the lever P and the short arm or hook $p'$ is such that heavier articles may be easily lifted and held in suspension by a single person, and for quick work the hook $p^3$ need not be utilized, as the person operating the device would hold the article in suspension at the same time it is moved from one rail to another.

I claim—

1. In an overhead-trolley carrier, the combination, with two rails, of a cross-over $m$, trolley N, carrier $n$, swivel-eye $n'$, and lever P, having a forked end $p'$, arm $p^2$, and hook $p^3$, substantially as described.

2. In an overhead-trolley carrier, the combination, with three or more rails, of a crossover to connect any two rails not adjacent to each other, said cross-over dropping under the intervening rail or rails, and a transferring device on said cross-over, substantially as described.

3. In an overhead-trolley carrier, a crossover to connect two rails, a trolley thereon, a lifting-lever supported thereby, and a retaining device to hold said lever in its position supporting a load, substantially as described.

In testimony whereof I have signed my name to this specification in the presence of two subscribing witnesses.

WILLIAM FISH GLENN.

Witnesses:
FREDERICK L. EMERY,
WM. E. DENHAM.